Dec. 9, 1941. A. DEMCAK Re. 21,972

EXAMINING TABLE

Original Filed Sept. 25, 1936 3 Sheets-Sheet 1

Inventor:
Andrew Demcak
By:
A. Trevor Jones
Atty.

Dec. 9, 1941. A. DEMCAK Re. 21,972

EXAMINING TABLE

Original Filed Sept. 25, 1936 3 Sheets-Sheet 2

Inventor:
Andrew Demcak
By:
A. Trevor Jones
Atty.

Dec. 9, 1941. A. DEMCAK Re. 21,972

EXAMINING TABLE

Original Filed Sept. 25, 1936 3 Sheets-Sheet 3

Inventor:
Andrew Demcak
By: A. Trevor Jones
Atty.

Reissued Dec. 9, 1941

Re. 21,972

UNITED STATES PATENT OFFICE 21,972

EXAMINING TABLE

Andrew Demcak, Two Rivers, Wis., assignor to Hamilton Manufacturing Company, Two Rivers, Wis., a corporation of Wisconsin Original No. 2,177,341, dated October 24, 1939, Serial No. 102,459, September 25, 1936. Application for reissue August 11, 1941, Serial No. 406,442

6 Claims. (Cl. 311—7)

This invention relates to an examining table or the like more particularly for the use of physicians and surgeons in their consulting offices.

A primary object of the invention is to provide an examining table which has a full range and variety of precision adjustments and which at the same time has its mechanism substantially concealed within an attractive cabinet support. The cabinet is desirably finished to have the appearance of ornamental wood to enhance its harmony with the environment of a consultation office rather than an operating room.

The invention also provides improved mechanism for affording possible adjustments of the members upon which the patient rests during examination, including not only means for adjusting these rest members angularly with respect to each other and to the cabinet but also means for moving the rest members in a common plane toward and from the cabinet.

Other objects and advantages will be apparent, and the invention will be readily understood, by reference to the following detailed description together with the accompanying drawings in which—

Figure 2:
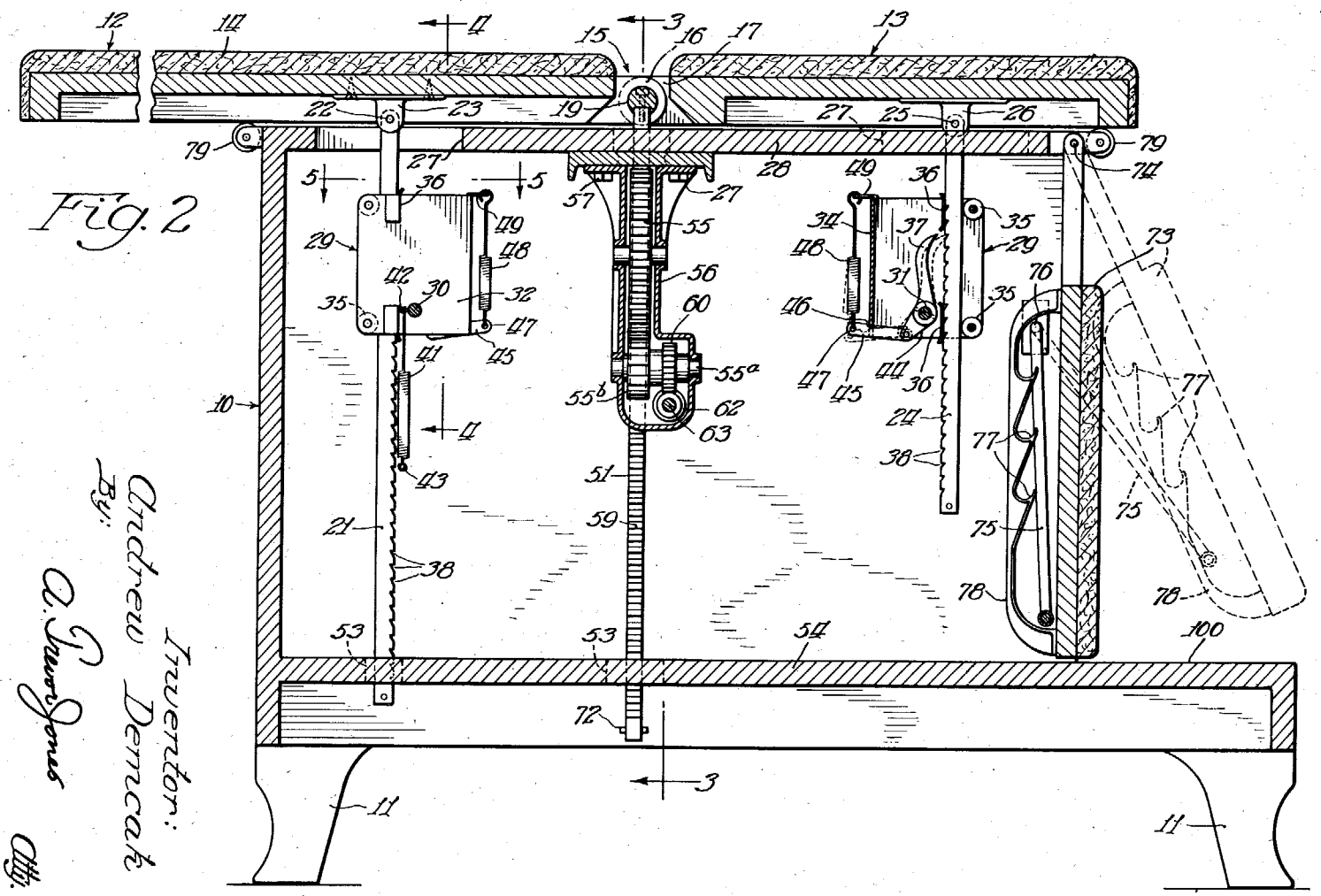
Figure 2 is a longitudinal section of the table of Fig. 1 on a larger scale and being a section taken on the line 2—2 of Fig. 3.

Referring in detail to the illustrative construction shown in the drawings, the cabinet 10 having legs 11 provides a support for the usual rest members 12 and 13 upon which the patient may recline, these rest members being desirably padded in the usual manner as shown at 14 (Fig. 2). One of these rest members, in this instance the member 12, may be longer than the other, as is customary in devices of this kind. The cabinet 10 also provides a concealing housing for the mechanism for adjustably supporting the rest members.

Figure 3:
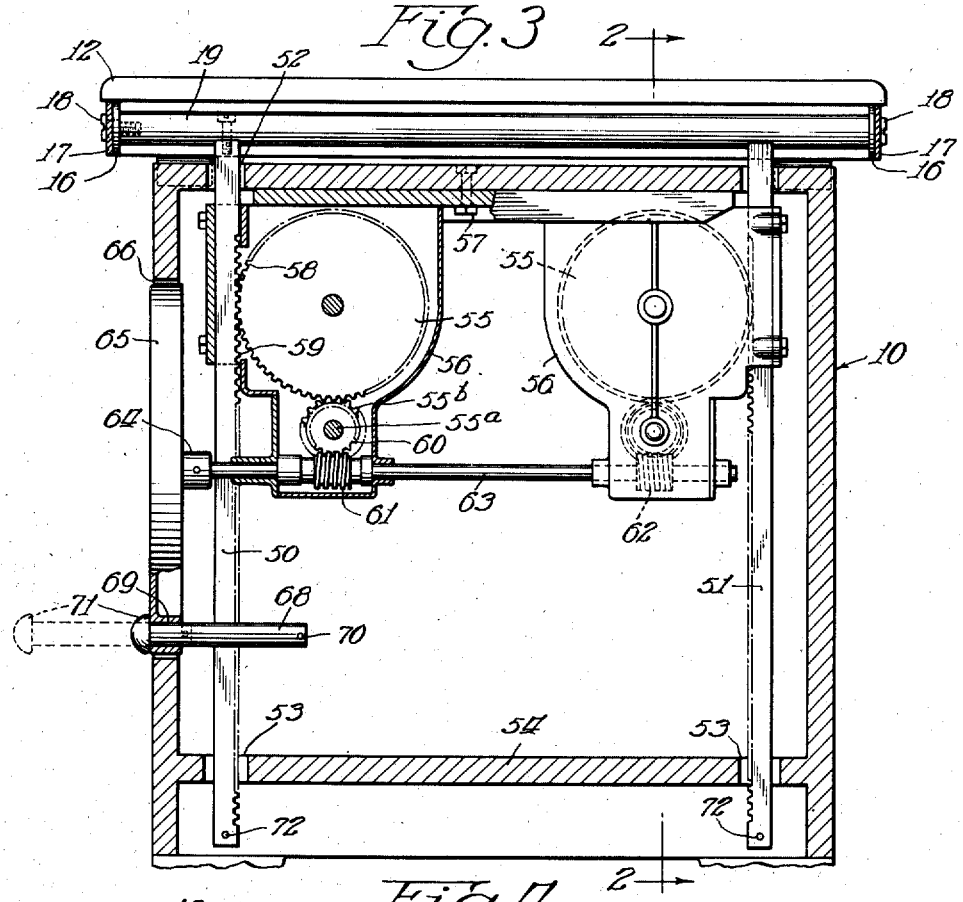
Figure 3 is a cross section taken on the line 3—3 of Fig. 2.
Figure 4:
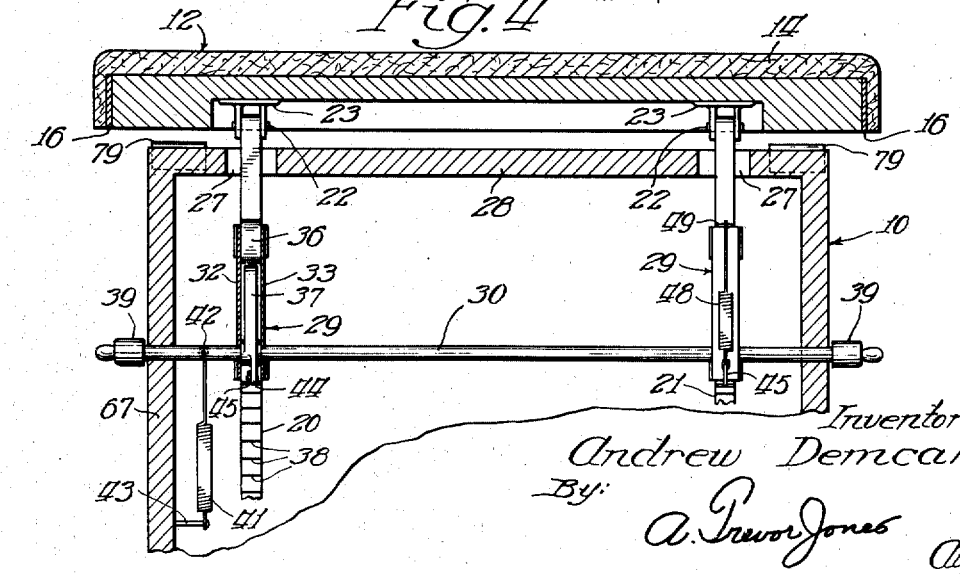
Figure 4 is another cross section taken on the line 4—4 of Fig. 2.

In this instance the rest members 12 and 13 are pivoted together at 15. As here shown the side plates 16 and 17 rigid respectively with the rest members 12, 13 are projected from these members at their adjacent edges and overlapped, the screw 18 (Fig. 3) passing through perforations in the pivot ears thus formed and into the bar 19, this bar thus providing a common pivot point for the rest members.

Extension supports are provided for each of the rest members, such extension supports being here shown in the form of lifter rods or bars in the case of the rest member 12 including two upright ratchet bars 20 and 21 which are pivoted at 22 to a bracket 23 for each bar, suitably secured adjacent opposite margins of the rest member 12 and on the under side thereof.

Similarly the rest member 13 is adjustably supported by extension members such as the ratchet bar 24 which is pivoted at 25 to the bracket 26 carried on the under side of the rest member 13. It will be understood that there may be two bars such as the bar 24.

The extension members just referred to pass through slots such as slot 27 in the top 28 of the cabinet 10 and down into the interior of the cabinet.

Associated with each of the ratchet bars just referred to, is detent means 29 only one of which need be described, they being substantially the same. These detent means are mounted within the cabinet on a rock shaft 30 for the rest member 12, and 31 for the rest member 13, the detent means being relatively rotatable with respect to the rock shaft.

Each of the detent means 29 as here constructed, comprises a rectangular casing having the side walls 32 and 33, and end wall 34, the side walls embracing one of the ratchet bars which passes snugly therethrough being held from lateral movement with respect to the detent means by these walls, and also by rollers 35 carried by the casing walls 32, 33 between which and guide plates 36, also carried by these walls, the ratchet bar may reciprocate as the rest members are moved up or down. Mounted on the rock shaft and pinned thereto within the walls 32, 33 is a pawl 37 which is engageable with ratchet teeth 38 on the ratchet bars, these parts being formed so that when the pawl is in engagement with the teeth the ratchet bar is held against downward movement but may be moved upwardly. Handles 39, 40 respectively for the rock shafts 30 and 31 each control the detent means for their respective rest members, by moving the pawls into or out of engagement with the ratchet teeth. It will be noted that as thus constructed and arranged each of the detent means 29 may pivot on its respective rock shaft to accommodate itself to the position toward or slightly from the vertical, assumed by the ratchet bars as the rest members are raised or lowered.

The rock shaft 30, 31 as the case may be, is resiliently held in rotative position (so that the pawls fixed thereto are in engagement with the ratchet teeth) by expansion springs 41 hooked at one end as at lever finger 42 to the rock shaft, and at the other end as at 43 to a wall of the cabinet. Means is provided for releasably retaining the pawls out of engagement with the ratchet bars when the rock shafts are rotated against the force of the springs 41. As here shown the pawl 37 is extended by a lever arm 44 to which is flexibly connected a link 45 having a notch 46 on its upper edge. This link passes under the lower edge of the wall 34 and its outer end 47 is supported by an expansion spring 48 which is hooked at its upper end as at 49 to the upper edge of the wall 34. Thus when the rock shaft is rotated against the force of the spring 41 to release the pawl as shown in full lines in Fig. 2 (which may be done by rotating the handle 40, for example, manually upwardly) the lower edge of the wall 34 engages within the notch 46 and the link 45 is resiliently held therein by the spring 48, preventing the spring 41 from rotating the pawl. Then the rest member may be lowered and to lock the member in lowered position the handle may be pressed downwardly, which forces the notch 46 out of engagement to restore the rock shaft to the influence of the spring 41. It will be understood that the edge of the notch 46 nearest the pawl may be so shaped that the spring 41 is not strong enough to cam the notch out of engagement with the wall 34 against the force of the spring 48, while this may be done by manually applied pressure to the handle 40, cumulative to the force of the spring 41.

In accordance with the invention the common pivot point of the rest members 12 and 13 is itself movable toward and from the cabinet. To accomplish this, elevator means are provided for raising and lowering the pivot bar 19. As here shown this bar is supported by upright rack bars 50 and 51, one at each side of the table and received within the cabinet, as by passing through slots 52 in the upper wall 28 thereof and slots 53 in the lower wall 54 thereof. For supporting and vertically reciprocating the rack bars 50, 51, mechanism is provided including the gear wheels 55, one of which is journaled in each of the casings 56, carried within and at each side of the cabinet 10 as by being suspended from the upper wall 28 thereof by bolts 57. Each of these gear wheels has gear teeth 58 engaging and meshing with the gear teeth 59 on one of the rack bars 50 or 51 as the case may be. To rotate the gear wheels 55 simultaneously but in opposite directions each of the casings 56 has journaled therein a stub shaft 55*a* which carries a spur pinion 55*b* which meshes with gear 55. The stub shaft 55*a* also carries a worm gear 60, which is driven by a worm 61 in one case, and by a worm 62 in the other case. These worms 61 and 62 have their helicals inclined in opposite directions and are each mounted within one of the casings 56 on a common shaft 63 which passes through these casings and is keyed to the hub 64 of a crank disc 65 which is snugly but rotatively received in a circular opening 66 in the front wall 67 of the cabinet 10 and to be substantially flush with this wall so as to be inconspicuous. A handle 68 is attached to the disc 65 for convenience in rotating the same; and to render the handle also inconspicuous when not being used, it is adapted to be slid back into the cabinet as shown in full lines in Fig. 3 through a slot 69 in the disc 65. The stop 70 on the inner end of the handle limits its outward position, as suggested in broken lines in Fig. 3, and a head 71 at the outer end of the handle limits its retracted position and also provides means by which it may be grasped to draw it outwardly when it is desired to use it as a crank.

Similar stops 72 on the lower ends of the ratchet and rack bars may limit their movement upwardly.

The table may also include a foot rest 73 hinged as at 74 to one end of the cabinet. A bail 75 also hinged to the cabinet as at 76 below the foot rest may engage one of a series of hook formations 77 formed in a bracket 78 secured to the under side of the foot rest member 73 to support it in adjusted position, as suggested by broken lines in Fig. 2.

Figure 1:
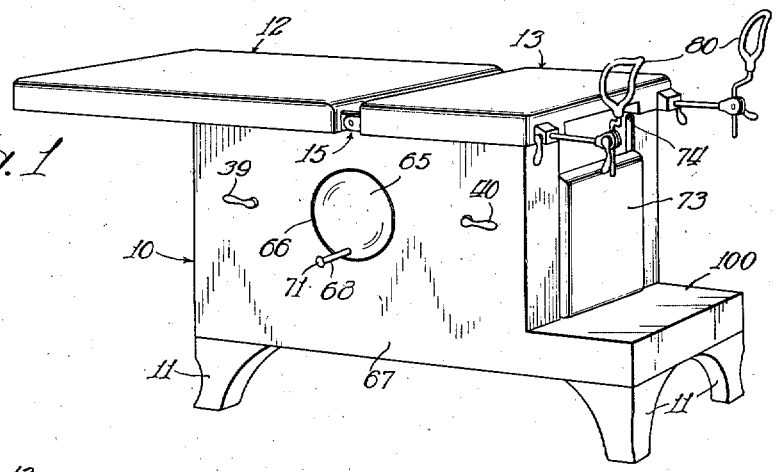
Figure 1 is a perspective view of an examining table embodying the present invention.
Figure 6:
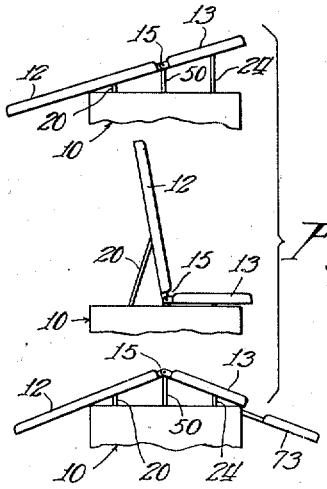
Figure 6 is a series of diagrammatic views showing several possible adjusted positions of the parts.
Figure 5:
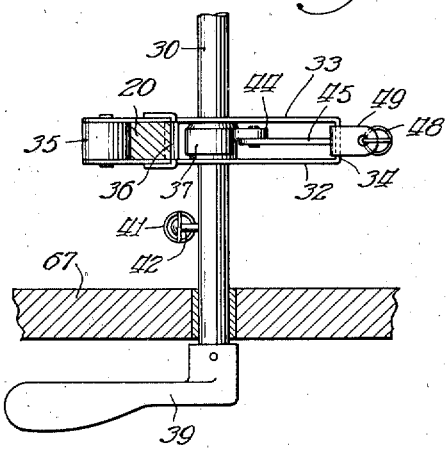
Figure 5 is a fragmentary detail view on a still larger scale, being a section taken on the line 5—5 of Fig. 2.

Thus, as suggested in Fig. 6, not only may the rest members 12, 13 be angularly related, as shown in the middle diagram of Fig. 6, without moving the pivot point 15, but also, as shown in the upper and lower diagrams of Fig. 6, this pivot point 15 may itself be moved upwardly either to place the rest members 12, 13 co-planarly, but at an angle with respect to the cabinet, or to angularly relate the rest members 12, 13 with these members sloping downwardly from their pivot point as shown in the lower diagram of Fig. 6.

It will be understood that to place the rest members in the position, for example, shown in the lower diagram in Fig. 6, the common pivot point of the rest members 12 and 13 is moved upwardly while the outer ends of these rest members, that is, their ends opposite their ends adjacent at the common pivot point, are free to slide on the cabinet to accommodate these outer ends to the elevation of the central pivot point 15. It will be understood also that during this sliding movement of the outer ends of the rest members, the ratchet bars are free to move upwardly and angularly, by reason of the construction described, to accommodate themselves to this sliding movement of the outer ends of the rest members.

In order to facilitate adjustment of the rest members 12, 13 the top of the cabinet may desirably carry anti-friction means such as rollers 79 upon which the outer edges of the rest members ride.

Although forming no part of the present invention the rest member 13 may be provided with alternative foot rests such as the conventional extensible stirrups 80.

The platform 100 formed in the cabinet at one end thereof adjacent the foot rests, may afford means for the patient to conveniently mount the table.

Having described the invention, what is claimed is:

1. In a structure of the class described, the combination with a cabinet and rest members carried thereby, of a central rack bar vertically reciprocal in the cabinet, a common pivot bar to which the adjacent rest members are pivoted carried by the upper end of said rack bar and movable vertically therewith toward and from the cabinet while the outer ends of said rest members are free to slide on said cabinet, gear means within the cabinet operatively associated with the rack bar including a member accessible on the outer face of the cabinet for reciprocating said rack bar, extension support means spaced longitudinally of the cabinet from the said central rack bar for angularly relating a rest member with respect to the common pivot point of the rest members, said extension support means including a bar pivoted to a rest member and vertically slidable in the cabinet, a longitudinally elongated slot in the cabinet receiving the extension support bar therethrough, and mechanism mounted in the cabinet for releasably gripping the extension support bar, said slot and mechanism permitting limited angular movement of the extension support bar whereby the extension support bar may adapt itself to angular positions of the rest member.

2. In a structure of the class described, the combination with a cabinet and a pair of rest members carried thereby, of a straight vertically extending rack bar vertically reciprocal in the cabinet and normally concealed therewithin, common pivot means to which the rest members are pivoted carried by the upper end of said rack bar and movable vertically therewith toward or elevated from the cabinet while the outer end of the rest member is free to slide on said cabinet toward and from said vertical bar, mechanism substantially concealed within the cabinet but including a handle accessible on the outer face of the cabinet for reciprocating said vertical rack bar, and extension support means operatively associated with the rest members including a member accessible on the outer face of the cabinet for angularly relating the rest members with respect to their common pivot means independently of said sliding movement of a rest member on the cabinet and when the common pivot means is in elevated position.

3. In a structure of the class described, the combination with a cabinet and rest members carried thereby, of a central rack bar vertically reciprocal in the cabinet, a common pivot bar to which the adjacent rest members are pivoted carried by the upper end of said rack bar and movable vertically therewith toward and from the cabinet, a gear train enclosed within the cabinet, means accessible on the exterior of the cabinet for operating the gear train, a pair of ratchet bar extension supports on opposite sides of the central rack bar for angularly relating the rest members with respect to their common pivot point, detent means engageable with each of the ratchet bars and including a rock shaft common to each pair of detent means, a pair of pawls on each rock shaft engageable with each of said ratchet bars respectively, a spring operatively associated with each rock shaft and urging the pawls into engagement with the ratchet bars, and handles accessible on the exterior of the cabinet for rotating the rock shafts to release the pawls.

4. In a structure of the class described, the combination with a cabinet and rest members carried thereby, of a central rack bar vertically reciprocal in the cabinet, a common pivot bar to which the adjacent rest members are pivoted carried by the upper end of said rack bar and movable vertically therewith toward and from the cabinet, a gear train enclosed within the cabinet, a crank handle operatively associated with said gear train and accessible on the exterior of the cabinet, a pair of ratchet bar extension supports on opposite sides of the central rack bar for angularly relating the rest members with respect to their common pivot point, detent means engageable with each of the ratchet bars and including a rock shaft common to each pair of detent means, a pair of pawls on each rock shaft engageable with each of said ratchet bars respectively, a spring operatively associated with each rock shaft and urging the pawls into engagement with the ratchet bars, handles accessible on the exterior of the cabinet for rotating the rock shafts to release the pawls, and yieldable means stronger than the action of the first mentioned spring operatively associated with each pawl for manually releasably maintaining the pawls temporarily out of engagement with the ratchet bars.

5. In an examining table of the class described, the combination with a hollow cabinet support, of a rest member pivoted thereon for receiving a patient in reclining position thereon, a pair of ratchet bars hinged to said rest member and depending within the support, a detent mechanism through which each bar passes downwardly and providing a releasable detent against downward movement of the bar while permitting free upward movement of the bar, a spring operatively associated with the detent mechanism, a rock shaft carried by the support for manually controlling said spring, said rock shaft also pivotally carrying said detent mechanism to permit the latter to adapt itself to variations from the vertical assumed by the said bars following pivotal movement of the rest member and said shaft having an end projecting exteriorly of the support, and a handle at said end of the rock shaft for rocking the shaft against the action of said spring to release the bars for downward movement.

6. In an examining table or the like, the combination with a support, of a rest member pivoted thereto for receiving a patient in reclining position thereon, a lifter rod hinged to the rest member and normally substantially vertically depending within the support, detent mechanism mounted on the support through which the lifter rod passes for gripping the lifter rod against downward movement of the lifter rod while permitting free upward movement of the rod, a spring operatively associated with the detent mechanism and urging the said mechanism into position to grip the rod against downward movement of the rod, a rock shaft carried by the support for manually rotating said detent mechanism against the action of said spring, said detent mechanism being arranged to accommodate variations from the vertical assumed by the lifter rod following pivotal movement of the rest member on the support and said shaft having an end projecting exteriorly of the support, a handle at said end of the rock shaft for rocking the shaft against the action of said spring to release the lifter rod for downward movement, and elevator means carried by the support for moving the first-mentioned pivot point of the rest member toward and from the support, the rest member thereupon pivoting also on said lifter rod at the hinge point of the lifter rod and rest member whereby the lifter rod during upward movement of the said first-mentioned pivot point of the rest member may follow the rest member upwardly.

ANDREW DEMCAK.